UNITED STATES PATENT OFFICE.

JOHN CHRISTIAN KERNER, OF ST. LOUIS, MISSOURI.

FIRE-PROOF BUILDING MATERIAL.

SPECIFICATION forming part of Letters Patent No. 313,501, dated March 10, 1885.

Application filed November 10, 1884. (No specimens.)

*To all whom it may concern:*

Be it known that I, JOHN CHRISTIAN KERNER, of St. Louis, Missouri, have made a new and useful Improvement in Fire-Proof Building Materials, of which the following is a full, clear, and exact description.

The chief advantage of the improved fire-proof material is its lightness. The material also possesses strength, and it can be readily and economically prepared, and in a suitable shape for walls, floors, &c. The base of the material is sawdust, with which is combined a substance which serves to unite the particles of sawdust, so that they may be made to assume a proper form for use. This substance should be non-combustible. The sawdust is thus both adapted for use and in a measure made fire-proof; but to render it more thoroughly fire-proof and to harden the compound, an additional fire-proof substance is associated with the others, whose aim and effect is to act more directly upon the sawdust in rendering it fire-proof. The substance preferably used by me to bond the sawdust is plaster-of-paris. Lime can also be used therefor. The first-named substance makes a stronger bond, but lime is a lighter substance and gives more body. Still better results are obtained by using both lime and plaster-of-paris to bond the sawdust. The most approved material for fireproofing the sawdust is alum, although such materials as hyposulphite of soda or bicarbonate of soda can be employed, and to more effectually treat the sawdust, so that it shall be fire-proof, it is subjected to a preliminary treatment—that is, before compounding the sawdust with the plaster, &c., and alum, it is soaked in a solution of hyposulphite of soda, and preferably dried, after which it is combined with the plaster, &c., and alum in substantially the same manner as when it is not subjected to the preliminary treatment. Other substances—such as alum, bicarbonate of soda, tungstate of soda, or silicate of soda—can be used in place of hyposulphite of soda for this preliminary treatment of the sawdust. A still better result is obtained by soaking the sawdust in a solution of hyposulphite of soda, and then in a solution of alum, which operation results in coating, and to some extent working into the particles of sawdust a solid silicate, formed by the union of the hyposulphite of soda and alum. This result, although not so effectively attained as when the sawdust is treated entirely by itself, can in a measure be arrived at by employing the fire-proof solution at that stage of the process at which the sawdust is bonded with the other solid material or materials—that is, the fire-proof solution may be added to the usual quantity of water used in uniting the sawdust and the plaster, &c. The solution, which may be of any of the above-named substances, hyposulphite of soda, alum, bicarbonate of soda, silicate of soda, &c., is also of itself a bond, and is useful in uniting the sawdust with the other solid material. The compound is further benefited by the addition of coal ashes and cinders, which material acts in a measure like sand in supplying silicates with which the lime can unite, and thereby cause silicate of lime to be formed in the compound. The specific gravity of the ashes, &c., being less than that of plaster-of-paris, also makes this material a desirable substitute, in part, for plaster-of-paris.

The most approved mode of uniting the sawdust with plaster-of-paris is as follows:

No. 1: one-half pint sawdust; five ounces plaster-of-paris; six ounces water; mix.

In combining the sawdust, plaster-of-paris, and alum the following formula answers:

No. 2: one-half pint sawdust; five ounces plaster-of-paris; ten ounces alum solution; mix.

When ashes are used, the following formula suffices:

No. 3: one-half pint sawdust; four ounces alum solution, and mix; then add two ounces ashes, and mix; five ounces plaster-of-paris; eight ounces alum solution, and mix.

When the sawdust is previously treated with one solution only, this formula suffices:

No. 4: one-half pint sawdust; two ounces solution of hyposulphite of soda; mix; then add four ounces plaster-of-paris; three ounces water; mix.

When the sawdust is treated with two solutions, this formula is a desirable one:

No. 5: one-half pint sawdust; two ounces alum solution; two ounces solution of hyposulphite of soda; mix and dry; then add five ounces plaster-of-paris; five and one-half ounces water, and mix.

When the sawdust receives the initial treatment—say, when the two solutions are used—the following formula answers:

No. 6: one-half pint sawdust; two ounces solution of alum; two ounces solution of hyposulphite of soda. After these have been dried in dust, add four ounces alum solution, and mix; five ounces plaster-of-paris; six and three-fourths ounces alum solution; mix well. In this instance, the amount of alum finally used may be somewhat varied.

In combining plaster-of-paris and lime with the sawdust and alum, this formula is a desirable one:

No. 7: one-half pint sawdust; two and one-half ounces alum solution; one-fourth pint lime solution or mixture; three and one-fourth ounces plaster-of-paris; one and one-fourth ounces alum solution; mix.

All the ingredients can be combined, as follows:

No. 8: Saturate one-half pint of sawdust with a solution of hyposulphite of soda, and then with a solution of alum, and then dry the dust; then add two ounces of ashes, and mix; then add four ounces of alum, and mix; then add one-half pint of lime, and mix; then add four ounces of plaster-of-paris, and mix; and then add sufficient water to enable the particles to be compounded.

I am aware that lime, plaster-of-paris, earthy matter, and alum have been combined to form a fire-proof material, as have, also, lime, plaster-of-paris, alum, asbestus, or cement. Plaster-of-paris, cement, sawdust, and hair have also been united to form a plastering compound. I therefore do not lay claim to such compounds, broadly, nor would they or either of them answer my purpose. The first-named compound would be too heavy. The second named is also too heavy and expensive. The last-named compound contains sawdust. This material, however, cannot be rendered fire-proof without employing such a proportion of plaster-of-paris and cement as to render the compound too heavy for the purpose I have in view—namely, a fire-proof building material of light weight. It will be observed that I overcome the difficulty named by combining alum with the sawdust and plaster-of-paris, by which means I am enabled to bond and fire-proof the sawdust with a much smaller quantity of plaster-of-paris than what would be necessary if the alum were not used.

I claim—

1. A fire-proof building material composed of sawdust treated with a fire-proof substance, as described, and afterward bonded with plaster-of-paris or lime, or both plaster-of-paris and lime, as described.

2. In a fire-proof building material, sawdust treated with a fire-proof solution, as and for the purpose described.

3. In a fire-proof building material, sawdust treated with hyposulphite of soda and alum, as and for the purpose described.

4. The combination of sawdust treated, as described, with a fire-proof substance, with plaster-of-paris and alum, as described.

Witness my hand.

JOHN CHRISTIAN KERNER.

Witnesses:
C. D. MOODY,
J. W. HOKE.